United States Patent Office 2,850,526
Patented Sept. 2, 1958

2,850,526
3-(HALOARYLOXY)-1,2-PROPANEDIOL ESTERS

Herman O. Senkbeil, Midland, Mich., assignor to The Dow Chemical Company, Midland, Mich., a corporation of Delaware No Drawing. Application July 26, 1956
Serial No. 600,170

6 Claims. (Cl. 260—487)

The present invention relates to the 3-(haloaryloxy)-1,2-propanediol esters of the polychloro lower aliphatic monocarboxylic acids. These compounds are viscous liquids or crystalline solids somewhat soluble in many organic solvents and of low solubility in water. They have been found to be active as plant growth control materials and are adapted to be employed as active toxic constituents in dust and spray compositions for the control of weeds and for the sterilization of soil with regard to plant growth. The compounds are very persistent in soil and may be distributed in the soil to control the growth of seeds and established vegetation over a prolonged period of time.

The new compounds may be prepared by reacting a 3-(haloaryloxy)-1,2-propanediol with a polychloro lower aliphatic monocarboxylic acid such as trichloroacetic acid, dichloropropionic acid, trichloropropionic acid, dichlorobutyric acid, trichlorobutyric acid and dichlorovaleric acid. The reaction may be carried out in the presence of an esterification catalyst such as sulfuric acid, phenol sulfonic acid or a cation exchange resin in the acid form and conveniently in a water immiscible solvent such as ethylene dichloride or toluene. Good results are obtained when at least two molecular proportions of the polychloro lower aliphatic monobarboxylic acid are reacted with one molecular proportion of the alcohol. The employment of an excess of the acid reagent and the removal of the water of reaction as formed generally results in optimum yields.

In carrying out the reaction, the acid, 3-(haloaryloxy)-1,2-propanediol and catalyst, if employed, are mixed and heated at a temperature of from 75° to 180° C. until the reaction is complete. When operating at temperatures above the boiling point of water, reduced pressure may be employed to remove the water of reaction as it is formed. In another method of operation, the reactants and catalyst are dispersed in a suitable inert organic solvent and the mixture heated at the boiling point. During the heating period, a mixture of solvent and water of reaction is continuously removed from the reaction vessel, condensed and the solvent recovered.

Upon completion of the reaction, the reaction mixture may be washed with water and thereafter partially distilled under reduced pressure to separate low boiling constituents and obtain the desired ester as a residue. Alternatively, the solvent mixture may be neutralized with a dilute aqueous solution of an alkali metal carbonate. The mixture separates into an aqueous layer and a solvent layer. The solvent layer containing the ester product is separated, washed with water and the solvent evaporated to obtain the desired ester as a residue. Where the desired product is a solid, it may be separated by filtration and purified by recrystallization from various organic solvents.

The following examples illustrate the invention, but are not to be construed as limiting:

Example 1.—3-(2,4,5-trichlorophenoxy)-1,2-propanediol bis(α,α,β-trichloropropionate)

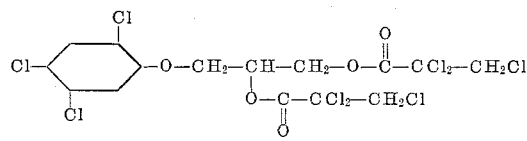

163 grams (0.92 mole) of α,α,β-trichloropropionic acid, 125 grams (0.46 mole) of 3-(2,4,5-trichlorophenoxy)-1,2-propanediol, and 1 milliliter of concentrated sulfuric acid were dissolved in 150 milliliters of ethylene dichloride. The mixture was heated for 45 hours at a temperature of from 107° to 124° C. while the water of reaction was continuously removed by distillation as a mixture with some of the solvent. After the heating period the reaction mixture was washed several times with water and partially distilled at temperatures gradually increasing up to a temperature of 230° C. at 1 millimeter pressure. As a result of these operations there was obtained as a viscous liquid residue a 3-(2,4,5-trichlorophenoxy)-1,2-propanediol bis(α,α,β-trichloropropionate) product having a saponification equivalent of 288 and a chlorine content of 54.2 percent compared to the calculated values of 295 and 54.1 percent.

Example 2.—3-(3,4-dichlorophenoxy)-1,2-propanediol bis(α,α,β-trichlorobutyrate)

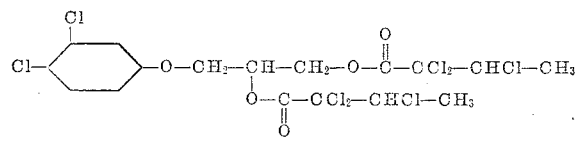

A mixture of 76.6 grams (0.4 mole) of α,α,β-trichlorobutyric acid, 38 grams (0.16 mole) of 3-(3,4-dichlorophenoxy)-1,2-propanediol and 2.5 milliliters of concentrated sulfuric acid was dissolved in 200 milliliters of ethylene dichloride. The resulting mixture was heated for 45 hours at a temperature of from 87° to 99° C. with continuous distillation of the water of reaction and some of the ethylene dichloride as previously described. Upon completion of the reaction, the reaction mixture was washed several times with water and partially distilled at temperatures gradually increasing up to 180° C. at 0.1 millimeter pressure to remove low-boiling constituents. As a result of these operations there was obtained a 3-(3,4-dichlorophenoxy)-1,2-propanediol bis(α,α,β-trichlorobutyrate) product as a viscous liquid residue having a saponification equivalent of 306 and a chlorine content of 45.7 percent compared to the theoretical values of 292 and 48.65 percent.

Example 3.—3-(4-chloro-2-methylphenoxy)-1,2-propanediol bis(α,α-dichloropropionate)

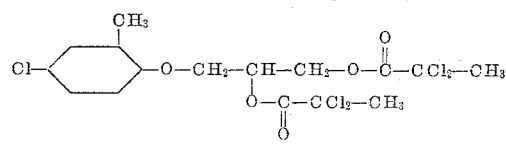

A mixture of 43.3 grams (0.2 mole) of 3-(4-chloro-2-methylphenoxy)-1,2-propanediol, 57.2 grams (0.4 mole) of α,α-dichloropropionic acid and 1 milliliter of concentrated sulfuric acid was dissolved in 150 milliliters of ethylene dichloride. The resulting mixture was heated for about 50 hours at a temperature of from 94° to 117° C. while the water of reaction was continuously removed by distillation as a mixture with some of the solvent. The reaction mixture was then partially distilled at temperatures gradually increasing up to 230° C. at 4 millimeters' pressure to obtain as a viscous liquid residue a 3-(4-chloro-2-methylphenoxy)-1,2-propanediol bis($\alpha,\alpha$ - dichloropropionate) product having a saponification equivalent of 233 and a chlorine content of 38.0 percent compared to the calculated values of 233 and 38.1 percent.

*Example 4.—3-(2,4,5-trichlorophenoxy)-1,2-propanediol bis($\alpha,\alpha$-dichloropropionate)*

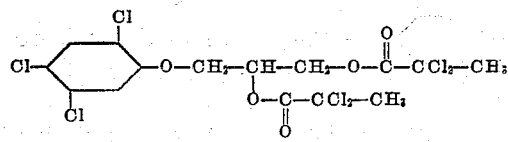

This esterification was carried out in the usual manner by heating a mixture of 81.4 grams (0.3 mole) of 3-(2,4,5-trichlorophenoxy)-1,2-propanediol, 85.8 grams (0.6 mole) of $\alpha,\alpha$-dichloropropionic acid and 200 milliliters of ethylene dichloride in the presence of 1 milliliter of sulfuric acid as catalyst. The mixture was heated at a temperature of from 97° to 118° C. for several hours while a mixture of the water of reaction and solvent was continuously removed by distillation. Upon completion of the reaction, the mixture was fractionally distilled at reduced pressure to obtain a viscous liquid product boiling at 198°–208° C. at 0.3 millimiter pressure. This liquid was diluted with methanol to precipitate the desired ester product as a white solid which melted at 78°–80° C. The solid had a saponification equivalent of 256 and a chlorine content of 47.1 percent compared to the calculated values of 260 and 47.6 percent.

*Example 5.—3 - (3,4-dichlorophenoxy)-1,2-propanediol bis($\alpha,\alpha$-dichlorobutyrate)*

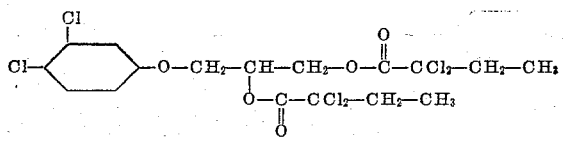

This compound was prepared in a manner similar to that described in Example 2 by heating a mixture of 47.4 grams (0.2 mole) of 3-(3,4-dichlorophenoxy)-1,2-propanediol, 66 grams (0.42 mole) of $\alpha,\alpha$-dichlorobutyric acid, 0.5 milliliter of concentrated sulfuric acid and 200 milliliters of ethylene dichloride at a temperature of from 87° to 108° C. for a period of 21 hours. Following the heating period, the reaction mixture was washed several times with water and partially distilled at temperatures gradually increasing up to 228° C. at 0.1 millimeter pressure to remove low boiling constituents. As a result of these operations, there was obtained a 3-(3,4-dichlorophenoxy)-1,2-propanediol bis($\alpha,\alpha$-dichlorobutyrate) product as a dark, viscous, liquid residue. This product had a saponification equivalent of 257 and a chlorine content of 41.1 percent compared to the theoretical values of 257 and 41.3 percent.

*Example 6.—3 - (3,4-dichlorophenoxy)-1,2-propanediol bis($\alpha,\alpha,\beta$-trichloropropionate)*

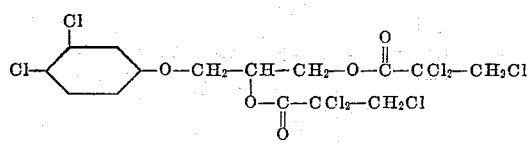

A mixture of 47.4 grams (0.2 mole) of 3-(3,4-dichlorophenoxy)-1,2-propanediol, 74.5 grams (0.42 mole) of $\alpha,\alpha,\beta$-trichloropropionic acid and 1 milliliter of concentrated sulfuric acid dissolved in 150 milliliters of ethylene dichloride was heated for 40 hours at 100° C. and the resultant mixture processed as described in Example 2. The low boiling constituents were removed by partial distillation at temperatures gradually increasing up to 225° C. at 1 millimeter pressure. A 3-(3,4-dichlorophenoxy)-1,2-propanediol bis($\alpha,\alpha,\beta$-trichloropropionate) product was obtained as a viscous liquid residue having a saponification equivalent of 292 and a chlorine content of 49.9 percent compared to the calculated values of 278 and 51.03 percent.

*Example 7.—3 - (3,4-dichlorophenoxy)-1,2-propanediol bis($\alpha,\alpha$-dichloropropionate)*

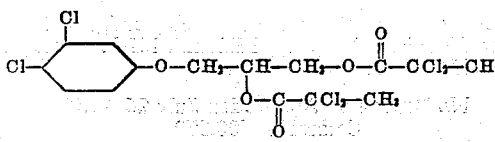

In a manner similar to that described in Example 1, a mixture of 47.4 grams (0.2 mole) of 3-(3,4-dichlorophenoxy)-1,2-propanediol, 60 grams (0.42 mole) of $\alpha,\alpha$-dichloropropionic acid and 1 milliliter of concentrated sulfuric acid in 200 milliliters of ethylene dichloride was heated for 40 hours at a temperature of from 100° to 113° C. Following the heating period, the reaction mixture was washed with water and fractionally distilled under reduced pressure. There was obtained as a clear viscous liquid a 3-(3,4-dichlorophenoxy)-1,2-propanediol bis($\alpha,\alpha$-dichloropropionate) product boiling at 190°–198° C. at 0.1 millimeter pressure and having a chlorine content of 42.7 percent compared to the theoretical value of 43.69 percent.

*Example 8.—3-(2,4,5-trichlorophenoxy)-1,2-propanediol bis(trichloroacetate)*

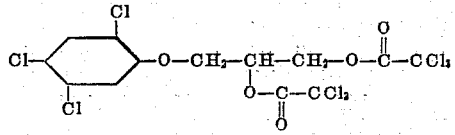

A mixture of 40.8 grams (0.25 mole) of trichloroacetic acid, 27.1 grams (0.1 mole) of 3-(2,4,5-trichlorophenoxy)-1,2-propanediol and 1.5 milliliters of concentrated sulfuric acid is dissolved in 150 milliliters of ethylene dichloride. The mixture is heated at the boiling temperature (92°–95° C.) for 41 hours during which time the water of reaction is continuously removed by distillation as a mixture with some of the ethylene dichloride. Following the heating period, the reaction mixture is washed several times with water. The ethylene dichloride is then removed by distillation under reduced pressure to obtain a 3-(2,4,5-trichlorophenoxy)-1,2-propanediol bis(trichloroacetate) product as a viscous liquid residue. This product has a molecular weight of 562.

*Example 9.—3 - (3,4-dichlorophenoxy)-1,2-propanediol bis($\alpha,\alpha$-dichlorovalerate)*

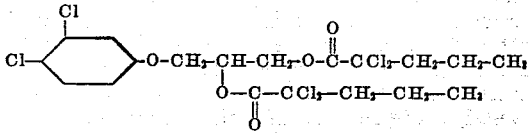

68.4 grams (0.4 mole) of $\alpha,\alpha$-dichlorovaleric acid, 38 grams (0.16 mole) of 3-(3,4-dichlorophenoxy)-1,2-propanediol and 0.5 milliliter of concentrated sulfuric acid are dissolved in 150 milliliters of ethylene dichloride. The resulting mixture is heated 18 hours at a temperature of from 87°–113° C. with continuous removal of the water of reaction by distillation as a mixture with some of the solvent. Following the heating period, the reaction mixture is partially distilled under reduced pressure to obtain a 3-(3,4-dichlorophenoxy)-1,2-propanediol bis($\alpha,\alpha$-dichlorovalerate) product as a viscous liquid residue. This product has a molecular weight of 543.

*Example 10.—3-(3,4-dibromophenoxy)-1,2-propanediol bis(α,α-dichloropropionate)*

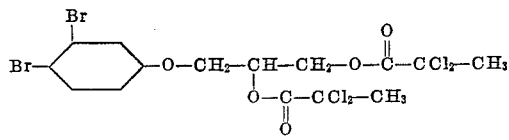

This compound is prepared by heating a mixture of two moles of 3-(3,4-dibromophenoxy)-1,2-propanediol, 4 moles of α,α-dichloropropionic acid and 1 milliliter of concentrated sulfuric acid in one liter of ethylene dichloride for about 50 hours at a temperature of 125° C. Upon completion of the reaction, the reaction mixture is washed with water and fractionally distilled under reduced pressure to obtain the desired ester product as a viscous liquid having a molecular weight of 434.

In a similar manner other 3-(haloaryloxy)-1,2-propanediol esters of polychloro lower aliphatic monocarboxylic acids may be prepared of which the following are representative:

3-(2-bromo-4-chlorophenoxy) - 1,2 - propanediol bis(α, α,β-trichloropropionate) by the reaction of 3-(2-bromo-4-chlorophenoxy)-1,2-propanediol and α,α,β-trichloropropionic acid.

3-(2,4,5-tribromophenoxy) - 1,2 - propanediol bis(α,α-dichlorobutyrate) by the reaction of α,α-dichlorobutyric acid and 3-(2,4,5-tribromophenoxy)-1,2-propanediol.

3-(4-bromo-2-methylphenoxy) - 1,2-propanediol bis(α, α-dichlorovalerate) by the reaction of 3-(4-bromo-2-methylphenoxy)-1,2-propanediol and α,α-dichlorovaleric acid.

The new compounds of the present invention have been tested and found to be effective as herbicides for the killing of weeds and the sterilization of soil with regard to plant growth. They are also valuable as fungicides and are adapted to be employed for the control of fungal organisms such as *Alternaria solani*. For such use the products may be dispersed on an inert finely divided solid and employed as dusts. Such mixtures may also be dispersed in water with or without the aid of a wetting agent and the resulting aqueous suspensions employed as sprays. In other procedures, the products may be employed as active toxic constituents in oil-in-water emulsions or aqueous dispersions with or without the addition of wetting, dispersing or emulsifying agents. In representative operations, 100 percent controls of the growth of the seeds and emerging seedlings of wild oats, canary grass and turnips have been obtained with 3-(2,4,5-trichlorophenoxy) - 1,2 - propanediol bis(α,α,β - trichloropropionate) when applied to soil at the rate of 20 pounds per acre.

The 3-(haloaryloxy)-1,2-propanediols employed as starting materials may be prepared by the reaction of a sodium halophenate and a glycerin chlorohydrin in substantially equimolecular proportions. The reaction is preferably carried out in the presence of a solvent such as methyl isobutyl ketone and at a temperature of 75° to 125° C. In carrying out the reaction, the glycerin chlorohydrin is added portionwise to the sodium halophenate dissolved in the solvent. The operation is carried out with stirring and at the reaction temperature. Upon completion of the reaction, the sodium chloride is removed by filtration and the filtrate fractionally distilled under reduced pressure to obtain the desired product.

The preferred embodiments of the present invention are the 3-(haloaryloxy)-1,2-propanediol esters of trichloroacetic acid, α,α-dichloropropionic acid, α,α,β-trichloropropionic acid, α,α-dichlorobutyric acid, α,α,β-trichlorobutyric acid, α,α-dichlorovaleric acid and α,α,β-trichlorovaleric acid. These compounds are characterized by the formula

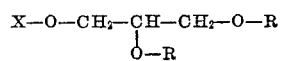

wherein X represents a haloaryloxy radical and R represents trichloroacetyl, α,α-dichloroacyl and α,α,β-trichloroacyl, said acyl radical containing from 3 to 5 carbon atoms, inclusive.

I claim:
1. A compound corresponding to the formula

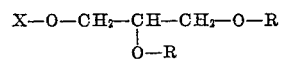

wherein X represents a member of the group consisting of the bromophenyl, chlorophenyl, bromotolyl and chlorotolyl radicals, and R represents a member of the group consisting of trichloroacetyl, α,α-dichloroalkanoyl and α,α,β-trichloroalkanoyl, said alkanoyl radicals containing from 3 to 5 carbon atoms, inclusive.

2. 3-(2,4,5-trichlorophenoxy) - 1,2 - propanediol bis(α, α,β-trichloropropionate).

3. 3-(3,4-dichlorophenoxy) - 1,2 - propanediol bis(α,α-dichloropropionate).

4. 3-(3,4-dichlorophenoxy)-1,2-propanediol bis(α,α-dichlorobutyrate).

5. 3-(3,4-dichlorophenoxy)-1,2 - propanediol bis(α,α,β-trichlorobutyrate).

6. 3-(3,4-dichlorophenoxy)-1,2-propanediol bis(α,α,β-trichloropropionate).

References Cited in the file of this patent

UNITED STATES PATENTS

| | | |
|---|---|---|
| 2,446,464 | Evans et al. | Aug. 3, 1948 |
| 2,734,075 | Brust et al. | Feb. 7, 1956 |
| 2,754,324 | Brust et al. | July 10, 1956 |

OTHER REFERENCES

Berger et al.: Chem. Abst. 47 (1953), 7593*f–h*.
Sakai et al.: Chem. Abst. 48 (1954), 13974*e–i*.